United States Patent [19]

Sherman et al.

[11] Patent Number: 6,060,114

[45] Date of Patent: May 9, 2000

[54] PROCESS FOR APPLYING WATERPROOF CERAMIC COATING COMPOSITIONS

[75] Inventors: Perry J. Sherman, Santa Ana; Joaquim R. Acevedo, Westminster, both of Calif.

[73] Assignee: Northrop Grumman Corporation, Los Angeles, Calif.

[21] Appl. No.: 09/036,450

[22] Filed: Mar. 6, 1998

[51] Int. Cl.$^7$ ........................................................ B05D 5/12
[52] U.S. Cl. ........................ 427/130; 427/128; 427/372.2; 427/376.1; 427/427
[58] Field of Search ............................ 427/372.2, 376.1, 427/130, 128, 427

[56] References Cited

U.S. PATENT DOCUMENTS

| | | |
|---|---|---|
| 3,752,683 | 8/1973 | Hawthorne ................................. 106/55 |
| 5,034,358 | 7/1991 | MacMillan ................................ 501/106 |
| 5,094,692 | 3/1992 | Dumazeau ............................. 106/286.8 |
| 5,310,422 | 5/1994 | Abdel-Latif ............................. 106/635 |
| 5,332,432 | 7/1994 | Okubi et al. ......................... 106/287.13 |
| 5,356,716 | 10/1994 | Patel ...................................... 428/423.1 |
| 5,468,290 | 11/1995 | Kelley ...................................... 106/635 |

*Primary Examiner*—Bernard Pianalto
*Attorney, Agent, or Firm*—Terry J. Anderson; Karl J. Hoch, Jr.

[57] ABSTRACT

Aqueous ceramic slurry compositions comprising a critical mixture of lithium silicate, sodium silicate, zirconia powder, glass frit and a magnetic filler, within predetermined amounts, and process of coating substrates therewith by spray or brush methods, and rapidly curing at low temperatures, up to about 500° F. and as low as below about 375° F. This provides a solid, protective, electromagnetic ceramic layer which is resistant to high humidity degradation or blistering after exposure to temperatures of about 1000° F., such as 0.4 mach hot gas.

11 Claims, No Drawings

PROCESS FOR APPLYING WATERPROOF CERAMIC COATING COMPOSITIONS

STATEMENT OF GOVERNMENT RIGHTS

The Government has rights in this invention pursuant to contract F33657-81-C-0067 awarded by the United States Air Force

BACKGROUND OF THE INVENTION

1. Field of the Invention

The present invention relates to novel aqueous, moisture-resistant, low temperature-curable ceramic slurry compositions which can be sprayed or coated onto ceramic or metallic substrates for thermal protection, insulation, wear-resistance or electromagnetic performance, such as repair compositions for application to metallic exhaust ducts of jet engines.

2. Description of the Prior Art

A wide variety of protective ceramic compositions are known for application to substrates exposed to high temperatures but such known compositions have disadvantages which preclude their use as repair materials, such as very high curing temperatures, and which result in a loss of physical integrity when exposed to humid environments after exposure to temperatures of about 1000° F. Many substrates are made of materials, such as titanium, which cannot withstand the high curing or firing temperatures required for most known ceramic compositions. Also, repair compositions must be applied to installed substrates, and high firing temperatures cannot be used to cure repair ceramic compositions on most such installed substrates, including automobiles and fueled aircraft Reference is made to U.S. Pat. No. 5,034,358 which discloses a protective zirconia/potassium silicate ceramic composition which is applicable to low melting temperature substrates, such as aluminum, and fired or cured at temperatures not exceeding about 500° F. to provide a ceramic which is wear-, corrosion- and heat-resistant. However such ceramic coatings soften and fail when exposed for a few days to 95% relative humidity at 95° F., which is true of all known sodium and potassium silicate ceramics.

Reference is also made to U.S. Pat. No. 5,310,422 which discloses a barium titanate/potassium/sodium silicate ceramic heat-resistant paint composition, which can contain glass frit instead of the alkali metal silicate, and is applied to substrates as an aqueous slurry and dried to form temperature-resistant paint coatings.

Such paint compositions also soften and degrade in humid environments.

Reference is made to U.S. Pat. No. 5,468,290 which discloses another aqueous ceramic coating composition containing a major amount of a metallic oxide, such as magnesium oxide, an alkali metal silicate, such as a sodium and potassium silicate, and silicon carbide fibers for producing temperature-and abrasion-resistant adhesive layers on sensors and sensor wires mounted on steel internal engine parts and cured at temperatures of 260° C. Such adhesive ceramic layers also soften and degrade in humid environments.

Therefore, there is a need for inexpensive protective ceramic compositions which can be applied by conventional methods, such as thermal spray, sol-gel and wet spray processes, onto a wide variety of substrates, including temperature sensitive substrates, such as titanium, and in temperature-sensitive environments, such as repair materials on installed substrates in an environment where high temperatures are too dangerous and/or are destructive of electrical or other components within said environment, and which are rapidly curable at low temperatures below about 500° F. to provide solid ceramic protective coatings which are resistant to softening and degradation after high temperature use upon exposure to high humidity above about 90% relative humidity, at temperatures above about 90° F. for at least about 7 days.

SUMMARY OF THE INVENTION

The present invention meets the aforementioned need by providing novel aqueous ceramic compositions comprising a critical mixture of lithium silicate, sodium silicate, zirconia powder, glass frit and a magnetic filler. Each of these ingredients is essential, within predetermined amounts, in order to provide a slurry which is applicable by spray or brush methods, is rapidly curable at low temperatures, up to about 500° F. and as low as below about 375° F., and provides a solid, protective, ceramic layer which is resistant to high humidity degradation or blistering after exposure to temperatures of about 1000° F., such as 0.4 mach hot gas.

DETAILED DESCRIPTION OF THE PREFERRED EMBODIMENTS

The novel compositions of the present invention contain the following ingredients within the indicated percentages by weight, based upon the solids content of the composition:

Lithium silicate is present within the range of from about 10% to about 20% by weight;

Sodium silicate is present within the range of from about 10% to about 25% by weight;

Zirconia powder, such as zirconium oxide or other suitable equivalent, is within the range of from about 10% to about 20% by weight;

Glass frit is present within the range of from about 2% to about 6% by weight, and Magnetic filler is present within the range of from about 40% to about 60% by weight to render the coating magnetic.

The solids are mixed within an aqueous vehicle to provide a slurry of the insoluble, dispersed zirconia powder, glass frit and magnetic filler and the water-soluble lithium and sodium silicates. The water content varies widely depending upon the viscosity required for the method of application, i.e., high viscosity or fluidity required for spray application and low viscosity required for brush application. In general the water content can comprise between about 5% and 50% by weight of the total composition.

Some of the water content is introduced as a component of the lithium silicate and of the sodium silicate, which materials are commercially-available in aqueous form under the trade names Aremco 516B, 516BT and 516, 516T, respectively, from Aremco Products, Inc. These materials have a water content of about 35% by weight The zirconia powder has a particle size within the range of about 0.1 to 20 micrometers, preferably between about 0.3 and 3 micrometers.

The glass frit preferably consists of corderite glass and has an average particle size between about 1 and 25 micrometers.

Suitable magnetic fillers include iron oxide, iron powder and similar magnetic powders and particles.

The ingredients are uniformly mixed to form a slurry which is applied to the substrate to be protected as a uniform layer of the desired thickness, and is cured, such as by heating for one hour at 350° F., to form a heat-resistant, erosion-resistant, insulating ceramic surface layer which resists blistering and degradation after being exposed to 1000° F. and subjected to 95% humidity at 95° F. for seven days. The total coating thickness ranges from 5 to 70 thousandths of an inch (0.005–0.070')

While the invention has been particularly shown and described with respect to preferred embodiments thereof, it will be understood by those skilled in the art that changes in form and details may be made therein without departing from the scope and spirit of the invention as described in the specification and defined in the appended claims

What is claimed is:

1. Process for coating the surface of a substrate with a moisture-resistant protective, ceramic layer which is resistant to high humidity degradation and blistering after exposure to temperatures of about 1000° F. which comprises:

a) producing a coating composition comprising an aqueous slurry of lithium silicate, sodium silicate, zirconia powder, glass frit and a magnetic filler.

b) applying said aqueous slurry onto the surface of a substrate as a uniform layer having the desired thickness, and c) heat-curing said layer at a temperature below about 500° F. to form a moisture-resistant, protective, electromagnetic ceramic coating which is resistant to high humidity degradation and blistering after exposure to temperatures of about 1000° F.

2. Process according to claim 1 which comprises applying said aqueous slurry by spraying it onto the surface of the substrate.

3. Process according to claim 1 which comprises applying said aqueous slurry by brushing it onto the surface of the substrate.

4. Process according to claim 1 in which the aqueous slurry of step (a) comprises between about 10% and 20% by weight of lithium silicate.

5. Process according to claim 1 in which the aqueous slurry of step (a) comprises between about 10% and 25% by weight of sodium silicate.

6. Process according to claim 1 in which the aqueous slurry of step (a) comprises between about 10% and 20% by weight of zirconia powder.

7. Process according to claim 1 in which the aqueous slurry of step (a) comprises between about 2% and 6% by weight of glass frit.

8. Process according to claim 1 in which the aqueous slurry of step (a) comprises between about 40% and 60% by weight of magnetic filler.

9. Process according to claim 1 in which the aqueous slurry of step (a) comprises between about 5% and 50% by weight of water.

10. Process according to claim 1 which comprises heat-curing said layer at a temperature below about 375° F.

11. Process according to claim 1 in which said substrate comprises a metallic substrate.

* * * * *